Aug. 9, 1955      K. H. CASSADY      2,714,934
POWER LAWN MOWER WITH REVERSING MECHANISM
Filed Nov. 14, 1952      2 Sheets-Sheet 1

INVENTOR
Kenneth H. Cassady

BY Mason, Fenwick & Lawrence
ATTORNEYS

Aug. 9, 1955 K. H. CASSADY 2,714,934
POWER LAWN MOWER WITH REVERSING MECHANISM
Filed Nov. 14, 1952 2 Sheets-Sheet 2
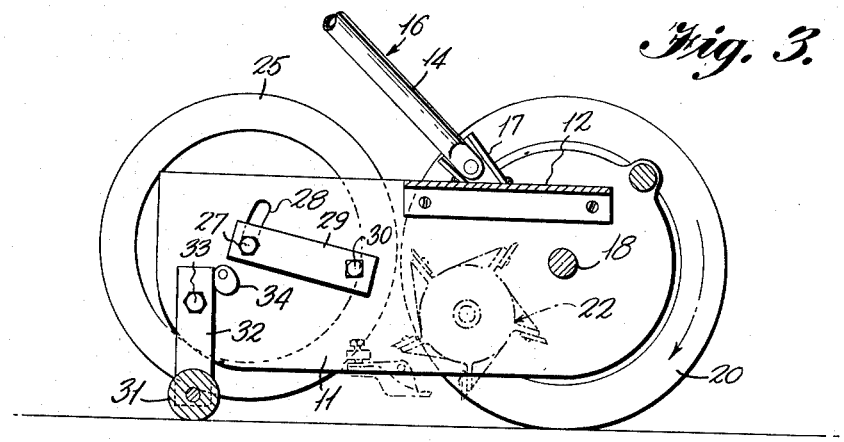
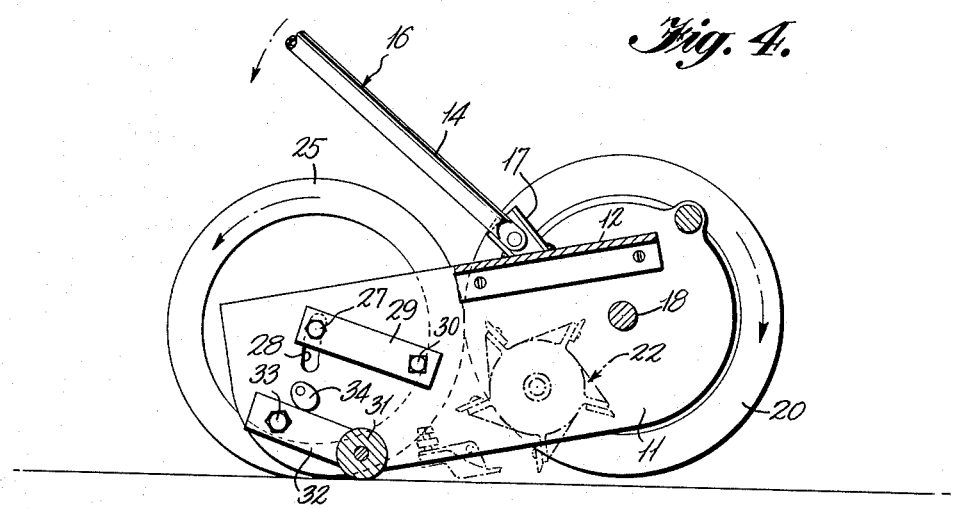
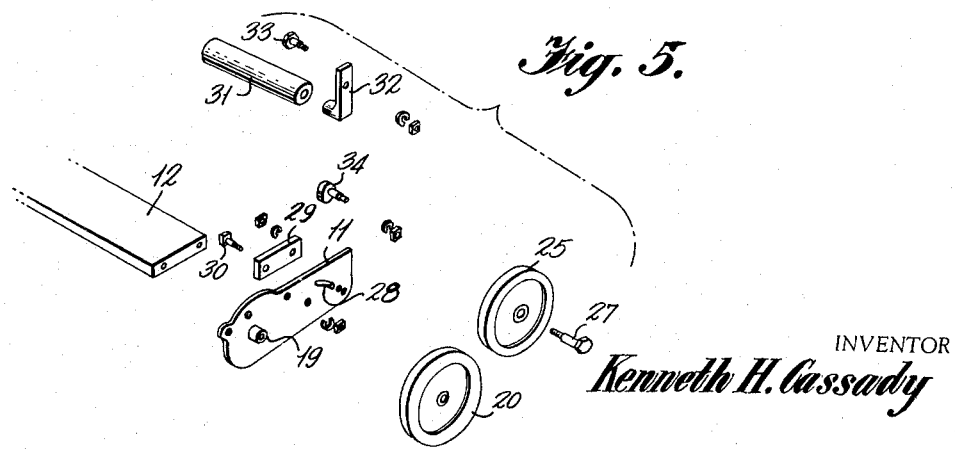
INVENTOR
Kenneth H. Cassady
BY Mason, Fenwick & Lawrence
ATTORNEYS

United States Patent Office 2,714,934
Patented Aug. 9, 1955

2,714,934

POWER LAWN MOWER WITH REVERSING MECHANISM

Kenneth H. Cassady, Miami, Fla.

Application November 14, 1952, Serial No. 320,495

6 Claims. (Cl. 180—19)

The present invention relates in general to power driven lawn mowers, and more particularly to power driven lawn mowers of the type having special means incorporated therein for facilitating reversing and turning of the power lawn mower.

Heretofore, various reversing mechanisms have been incorporated in power lawn mowers permitting the direction of drive imparted to the driven wheels of the lawn mower to be reversed or permitting one wheel to idle while the other is driven, in order to reverse the direction of movement of the lawn mower or turn the lawn mower in the desired direction. These, however, usually employed a rather complex coupling mechanism between the prime mover or motor and the lawn mower wheels, by which the direction of drive imparted to the lawn mower wheels is reversed. Turning mechanisms require the incorporation of rather complex friction clutches in the means coupling power to the wheels to vary the torque coupled to individual wheels to facilitate turning of the device.

An object of the present invention is the provision of a power lawn mower having means for reversing the direction of movement of the mower, which is relatively simple in construction and inexpensive in manufacture and maintenance.

Another object of the present invention is the provision of a novel reversing mechanism for power driven lawn mowers, which is devoid of the complex power coupling reversing mechanism characteristic of the above mentioned prior art lawn mowers.

Another object of the present invention is the provision of a power driven lawn mower having means selectively intercoupled with the motor thereof to drive the lawn mower in a reversed direction of movement on tilting of the lawn mower.

Another object of the present invention is the provision of a novel power driven lawn mower having means incorporated therein selectively controlling the direction of movement of the lawn mower and idling of the drive wheels thereof in response to tilting of the lawn mower.

Other objects, advantages and capabilities of the present invention will become apparent from the following detail description, taken in conjunction with the accompanying drawings, wherein only a preferred embodiment of the invention is illustrated.

In the drawings:

Figure 3 is a vertical longitudinal section taken along the lines 3—3 of Figure 2, and illustrating the lawn mower in forward driving position;

Figure 4 is a section view corresponding to Figure 3, but illustrating the lawn mower in a position imparting reverse drive thereto; and Figure 5 is an exploded view of the components permitting selective reverse movement of the lawn mower.

Figure 1:
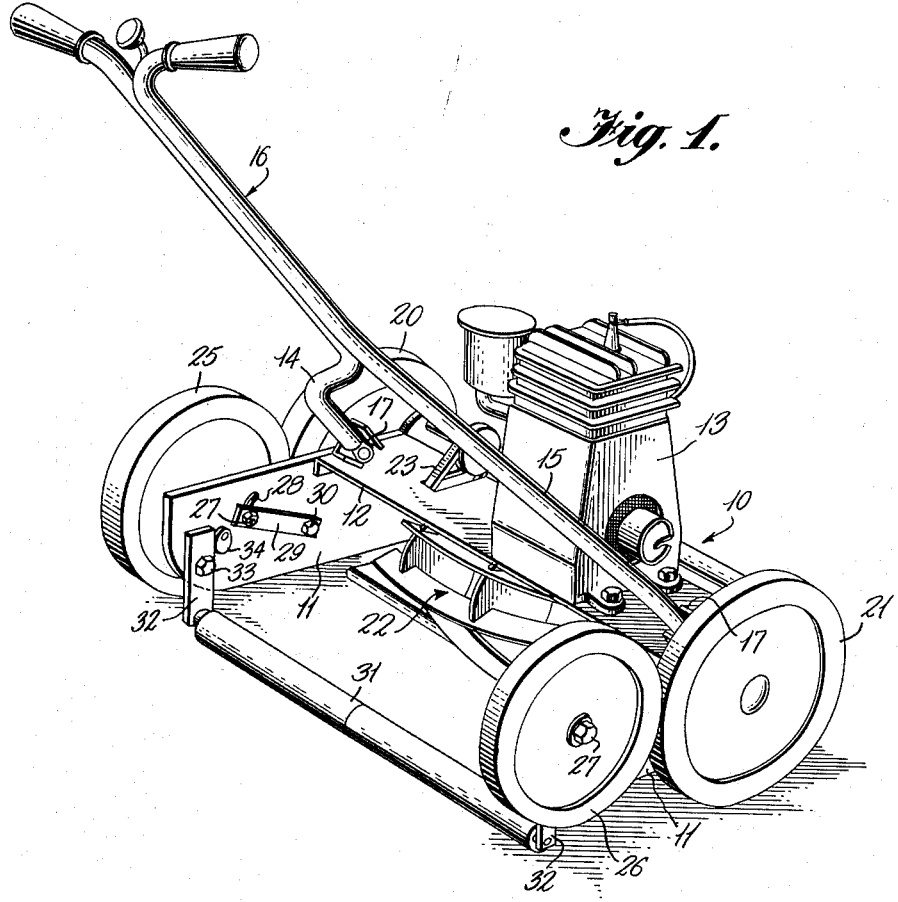
Figure 1 is a perspective view of a power driven lawn mower embodying the present invention.
Figure 2:
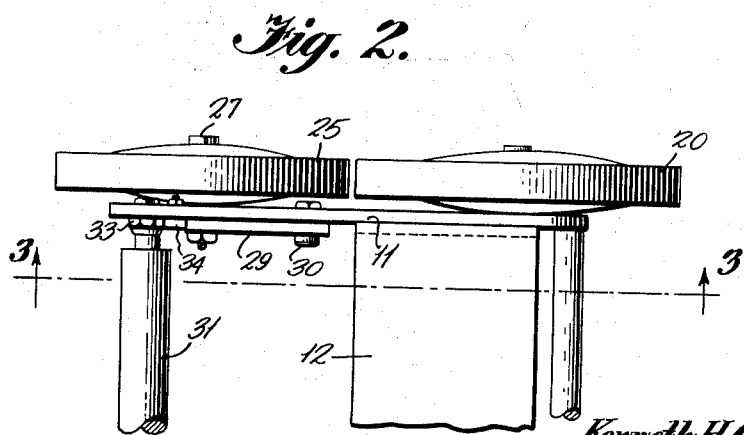
Figure 2 is a top plan view of one side of the lawn mower shown in Figure 1 illustrating the manner in which the forward and reverse driven wheels are coupled to the lawn mower chassis.

Referring to the drawings, wherein like reference characters designate corresponding parts throughout the several figures, the lawn mower embodying the present invention is generally indicated by the reference character 10. The lawn mower 10 comprises a pair of side plates generally indicated at 11 between which is disposed an engine bed 12 preferably bolted to the side plates 11 to form a frame therewith. The engine bed 12 supports any suitable motor or engine, generally indicated at reference character 13, for driving the lawn mower. A pair of tubular handle members 14 and 15 connected together along the upper portion thereof form the handle 16 of the mower, and are coupled by any conventional coupling elements such as indicated at 17 to the engine bed 12 so that the angular position of the handle 16 relative to the ground will determine the orientation of the frame formed of the side plates 11 and engine bed 12. An axle 18 is journaled in suitable bearing 19 in each of the side plates 11, in the forward part of the side plates 11, and is adapted to receive on its opposite ends a pair of ground-engaging forward driving wheels 20 and 21. Suitable bearing means are also provided in the side plates 11 and disposed rearwardly of the bearings 19 for journaling a conventional cutter reel 22. The axle 18 and cutter reel 22 are provided with pulley sheaves thereon about which a driving belt 23 is disposed, and extends through a suitable opening provided in the engine bed 12 and about a pulley driven from the engine 13.

The lawn mower is also provided with a pair of reversing wheels 25 and 26, each of which are journaled by means of a bolt 27 extending through an arcuate slot 28 provided in each of the side plates 11 and threadedly mounted in a pivoted arm or hanger 29 pivotally coupled to the side plates 11 by pivot bolt 30 disposed at the axis about which the arcuate slot 28 is formed. The pivoted arm 29 and slot 28 are so located along the side plates 11 that the reversing wheels 25 and 26 are positioned out of engagement with the driving wheels 20 and 21 when the bolt 27 is disposed at the lowermost point of the slot 28, and the wheels 25, 26, are brought into frictionally driven engagement with the driving wheels 20 and 21 when the mower handle 16 is tilted to shift the bolt 27 upwardly through the slot 28.

A roller 31 of conventional construction is likewise mounted between the side plates 11 by means of a roller hanger or arm 32, the roller being connected to the lower end of the hanger 32 for rotation about its own axis and the hanger 32 being pivotally coupled to the side plates 11 by means of a suitable bolt 33. An adjusting stop 34 in the shape of an eccentric cam is also secured to the side plates 11 in a position to be engaged by a portion of the roller hanger disposed about the pivot bolt 33 when the hanger and roller are positioned for forward movement of the mower as illustrated in Figure 3, and to be engaged by a portion of the roller hanger 32 disposed below the bolt 33 when the roller hanger is tilted to effect reverse movement of the mower as illustrated in Figure 4, the adjusting stop cam 34 therefor serving as a limit stop for the roller hanger.

Operation of the lawn mower to effect controlled forward and reverse drive thereof is as follows: When the handle 16 is disposed to position the mower as illustrated in Figure 3, the roller hanger 32 is disposed vertically with the axis of the roller 31 and the roller hanger pivot bolt 33 vertically aligned, and the upper portion of the hanger 32 in abutment with the adjusting stop cam 34, so that the rear portion of the side plates 11 are elevated to a position where the bolt 27 on which the reversing wheels 25 and 26 are journaled is supported at the lower end of the slot 28. The reversing wheels 25 and 26 in this position are held out of engagement with the forward driving wheels 20 and 21 and the reversing wheels 25 are elevated out of contact with the ground. So long as the handle 16 is held in this relatively elevated position, the mower will be driven in a forward direction by the forward drive imparted to the wheels 20 and 21 through the belt 23 and motor 13.

When it is desired to reverse the direction of drive of the lawn mower, the handle 16 is tilted downwardly to the position illustrated in Figure 4, the side plates 11 then assuming the position shown resulting in the roller hanger 32 being rotated forwardly about its pivot 33 until the hanger 32 is again brought into abutment with the adjustment stop cam 34. This brings the reversing wheels 25, 26 first into contact with the ground, and then into engagement with the driving wheels 20, 21 as the further downward tilting of the handle 16 and side plates 11 shifts the bolts 27 about which the reversing wheels are journaled upwardly through the arcuate slot 28. The hangers 29 during this continued tilting of the mower after the reversing wheels 25, 26 engage the ground, are tilted about the bolts 30 mounted in the side plates 11. The adjustment stop cam 34 is so positioned that when the roller hanger 32 engages the enlarged portion of the stop cam 34, the forward driving wheels 20 and 21 are elevated slightly out of engagement with the ground, so that the torque derived from the motor 13 drives the mower in a reverse direction through the reversing driving wheels 25, 26. The mower may be again driven in a forward direction merely by elevating the handle 16 to a position disposing the roller hanger 32 again in a vertical plane, with the reversing wheels 25, 26 pivoted out of engagement with the forward driving wheels 20, 21, and lifted out of contact with the ground.

There is an intermediate position for the roller hanger 32 between the two stop positions in abutment with the adjusting stop 34 at which both the forward driving wheels 20, 21 and the reverse driving wheels 25, 26, are supported by the roller 31 out of engagement with the ground, permitting the motion of the lawn mower to be stopped without disengagement of driving clutches such as are required in conventional lawn mowers.

Additionally, because the roller 31 is a split roller of two independent halves, the position of one of the roller hangers 32 can be inclined to such neutral position by tilting the mower handle 16 to dispose the wheels on one side of the lawn mower out of contact with the ground while the forward driving wheel on the other side remains in contact with the ground to effect turning of the mower under its own power.

While but one particular embodiment of the invention has been particularly shown and described, it is distinctly understood that the invention is not limited thereto but that various modifications may be made in the invention without departing from the spirit and scope thereof, and it is desired, therefore, that only such limitations shall be placed thereon as are imposed by the prior art and are set forth in the appended claims.

What is claimed is:

1. A power driven lawn mower comprising a frame, a motor supported on said frame, a pair of forward driving wheels journaled on said frame and intercoupled with said motor, a second pair of wheels for imparting rearward movement to said frame, wheel hangers pivoted on said frame, means journaling said second pair of wheels on said wheel hangers, means on said frame limiting pivotal movement of said wheel hangers to support said wheel hangers on preselected upward tilting of said frame, roller means, roller hanger means pivoted on said frame, stop means on said frame positioning said roller means when said frame is substantially horizontal to support said second pair of wheels out of contact with the ground and out of contact with said forward driving wheels, said stop means engaging said roller hanger means in another position on tilting of said frame downwardly to bring said second pair of wheels into contact with the ground, shift said wheel hangers to bring said second pair of wheels into driving engagement with said forward driving wheels, and lift said forward driving wheels out of contact with the ground.

2. In a power driven lawn mower, the combination recited in claim 1 wherein said roller hanger means may be selectively shifted to a position on tilting of said frame to support said frame on said roller means with said forward driving wheels and said second pair of wheels out of contact with the ground.

3. A power driven lawn mower comprising a frame, a motor supported on said frame, a pair of forward driving wheels journaled on said frame and intercoupled with said motor, a second pair of wheels for imparting rearward movement to said frame, pivoted arms on said frame having means thereon supporting said second pair of wheels, said frame having arcuate slots therein limiting pivotal movement of said arms to a preselected arc, roller means, hanger members pivoted on said frame and supporting said roller means, and stop means on said frame to be engaged by and position said hanger members at two stop positions, said roller means when said hanger members are in one of said stop positions supporting said frame in a substantially horizontal position wherein said arms are positioned by interengagement with said slots to support said second pair of wheels out of contact with said forward driving wheels and the ground, and said roller means when said hanger members are in the other of said stop positions supporting said frame in an inclined position wherein said forward driving wheels are disposed out of contact with the ground and said second pair of wheels contact the ground and pivot said arms upwardly relative to said slots to dispose said second pair of wheels in driving engagement with said forward driving wheels.

4. In a power driven lawn mower, the combination recited in claim 3 wherein an intermediate position for said hanger members between said two stop positions is provided, said roller means when said hanger members are in said intermediate position supporting said frame at an inclination disposing said forward driving wheels and said second pair of wheels out of contact with the ground, whereby forward motion of said lawn mower may be stopped by inclining said lawn mower to dispose said hanger members in said intermediate position.

5. A power driven lawn mower comprising a frame, a motor supported on said frame, a pair of forward driving wheels journaled on said frame and intercoupled with said motor, a second pair of wheels for imparting rearward movement to said frame, pivoted arms on said frame having means thereon supporting said second pair of wheels, said frame having arcuate slots therein limiting pivotal movement of said arms to a preselected arc, roller means, hanger members pivoted on said frame and supporting said roller means, a handle extending from said frame, the inclination of said handle determining the position of said hanger members about their pivots, and stop means on said frame to be engaged by and position said hanger members at two stop positions, said roller means when said hanger members are in one of said stop positions supporting said frame in a substantially horizontal position wherein said arms are positioned by interengagement with said slots to support said second pair of wheels out of contact with said forward driving wheels and the ground, and said roller means when said hanger members are in the other of said stop positions supporting said frame in an inclined position wherein said forward driving wheels are disposed out of contact with the ground and said second pair of wheels contact the ground and pivot said arms upwardly relative to said slots to dispose said second pair of wheels in driving engagement with said forward driving wheels.

6. In a power driven lawn mower, the combination recited in claim 5 wherein an intermediate position for said hanger members between said two stop positions is provided, said roller means when said hanger members are in said intermediate position supporting said frame at an inclination disposing said forward driving wheels and said second pair of wheels out of contact with the ground, whereby forward motion of said lawn mower may be stopped by inclining said lawn mower to dispose said hanger members in said intermediate position.

References Cited in the file of this patent

UNITED STATES PATENTS

| | | |
|---|---|---|
| 2,464,980 | Kuehn | Mar. 22, 1949 |
| 2,604,747 | Bash | July 29, 1952 |